(12) United States Patent
Schwarz

(10) Patent No.: US 6,367,571 B1
(45) Date of Patent: Apr. 9, 2002

(54) DRIVE WHEEL SYSTEM FOR INDUSTRIAL TRUCKS

(75) Inventor: Ulrich Schwarz, Aschaffenburg (DE)

(73) Assignee: Linde Aktiengesellschaft (DE)

( * ) Notice: Subject to any disclaimer, the term of this patent is extended or adjusted under 35 U.S.C. 154(b) by 0 days.

(21) Appl. No.: 09/266,158

(22) Filed: Mar. 10, 1999

(30) Foreign Application Priority Data

Mar. 19, 1998 (DE) .......................... 198 12 107

(51) Int. Cl.[7] .............................. B60K 17/30; B62D 5/10
(52) U.S. Cl. ...................... 180/253; 180/252; 180/65.5
(58) Field of Search ................................. 180/211, 214, 180/213, 65.5, 65.6, 65.1, 12, 13, 402, 253, 212; 192/221.1; 475/311, 149

(56) References Cited

U.S. PATENT DOCUMENTS

| | | | | |
|---|---|---|---|---|
| 3,163,250 A | * | 12/1964 | Gibson | 180/65.5 |
| 3,166,139 A | * | 1/1965 | Ulinski | 180/13 |
| 3,223,192 A | * | 12/1965 | Dorion et al. | 180/13 |
| 3,370,668 A | * | 2/1968 | Goodacre | 180/253 |
| 3,439,766 A | * | 4/1969 | Dence et al. | 192/221.1 |
| 3,608,661 A | * | 9/1971 | Arnot | 475/149 |
| 3,684,046 A | * | 8/1972 | Begleiter | 180/65.6 |
| 3,812,928 A | * | 5/1974 | Rockwell et al. | 475/149 |
| 4,142,615 A | * | 3/1979 | Sidles, Jr. et al. | 192/221.1 |
| 4,223,769 A | * | 9/1980 | Servanton et al. | 192/221.1 |
| 4,887,686 A | * | 12/1989 | Takei et al. | 180/211 |
| 5,045,036 A | * | 9/1991 | Reuter et al. | 192/221.1 |
| 5,048,626 A | * | 9/1991 | Strehler et al. | 180/65.6 |
| 5,088,967 A | * | 2/1992 | Opitz et al. | 475/311 |
| 5,253,726 A | * | 10/1993 | Weyer | 180/402 |
| 5,325,935 A | * | 7/1994 | Hirooka et al. | 180/211 |
| 5,581,136 A | * | 12/1996 | Li | 180/65.5 |
| 5,691,584 A | * | 11/1997 | Toida et al. | 180/65.5 |
| 5,796,192 A | * | 8/1998 | Riepl | 180/65.5 |
| 5,924,506 A | * | 7/1999 | Perego | 180/65.5 |

* cited by examiner

Primary Examiner—Kevin Hurley
Assistant Examiner—Hau Phan
(74) Attorney, Agent, or Firm—Webb Ziesenheim Logsdon Orkin & Hanson, P.C.

(57) ABSTRACT

A drive wheel system for industrial trucks can be rotated around a vertical axis and has a hub carrier, a hub that is mounted on it and carries a driven wheel, an electric travel motor and preferably a downstream travel gearbox. The invention teaches that the travel motor is realized in the form of a disc armature motor. The travel motor, the hub with the wheel and the travel gearbox, if present—viewed in section along the axis of rotation of the wheel—are located inside an envelope circle, the diameter of which approximately equals the outside diameter of the wheel. A drive shaft of the travel motor is non-rotationally connected with a sun wheel of a first stage of the travel gearbox realized in the form of a planetary gear train. A web of a second stage of the travel gearbox is non-rotationally connected with the hub carrier and a ring gear of the second stage of the travel gearbox is connected with the hub. The wheel is located axially between the travel motor and the travel gearbox. The hub is mounted by means of at least two tapered roller bearings that are oriented at least approximately symmetrically to the vertical axis. A braking device is located radially inside the mounting of the hub and axially between the travel motor and the travel gearbox.

16 Claims, 11 Drawing Sheets

DRIVE WHEEL SYSTEM FOR INDUSTRIAL TRUCKS

BACKGROUND OF THE INVENTION

1. Field of the Invention

This invention relates generally to a drive wheel system for industrial trucks that can be rotated around a vertical axis and includes a hub carrier, a hub mounted on the hub carrier which supports a driven wheel, and an electric travel motor.

2. Description of the Currently Available Technology

A known drive wheel system is described in GB 1 481 558. This drive wheel system has a travel motor that is a conventional radial field direct-current motor, e.g., a bar-wound armature motor, and is accordingly quite large. To reduce to a minimum the space required for construction, the travel motor is located radially inside the drive wheel. The housing of the travel motor serves as the hub carrier. Such a drive wheel system is used, for example, on a lift truck pulled by a tow bar or on a warehouse lift truck.

It is an object of the invention to provide a compact drive wheel system using means that are different from those in the known drive wheel systems.

SUMMARY OF THE INVENTION

The invention teaches that the drive motor of the drive wheel system of the invention is a disc armature motor. Disc armature motors require significantly less installation space than the radial field motors used in the known drive wheel systems, so that a designer has the maximum degree of freedom in the design and realization of the drive wheel system.

Downstream of the drive wheel system, there is advantageously a travel gearbox. This configuration makes it possible to keep the size of the travel motor small. To achieve particularly space-saving dimensions, the invention teaches that the travel motor, the hub with the wheel and the travel gearbox, if present, viewed in section along an axis of rotation of the wheel, are located within an envelope circle, the diameter of which approximately equals an outside diameter of the drive wheel system. Even when a wheel with only a small outside diameter is used, the envelope circle is not exceeded on account of the realization of the drive wheel system with a disc armature motor, in accordance with the invention.

In one advantageous refinement of the invention, the travel gearbox is realized in the form of a planetary gear train. A planetary gear train makes possible a large gear reduction while retaining a compact size.

A drive shaft of the travel motor is advantageously non-rotationally connected to a sun wheel of a first stage of the travel gearbox. A web of a second stage of the travel gearbox is non-rotationally connected with the hub carrier or is formed on the hub carrier. A ring gear of the second stage of the travel gearbox is connected with the hub.

If the wheel is located axially between the travel motor and the travel gearbox, both the travel motor and the travel gearbox are easily accessible. This is advantageous in particular during the assembly and installation of the drive wheel system of the invention.

With regard to the load-carrying capacity of the wheel bearing and the requirement for a small installation space, it is advantageous if the hub is mounted by means of at least two tapered roller bearings that are oriented at least-approximately symmetrically to the vertical axis.

In one favorable realization of the invention, a braking device can be provided that is located radially inside the mounting of the hub and axially between the travel motor and the travel gearbox.

The drive wheel system of the invention has advantages with regard to low maintenance requirements or no maintenance requirements at all if the braking device is realized in the form of a wet-running spring-loaded multi-disc brake.

On tow bar-guided industrial trucks in which the brake must engage due to technical requirements when the tow bar comes detached, it is favorable if the braking device is released by means of a mechanically actuated linkage. This linkage is effectively connected with the tow bar, which can move up and down.

In an additional configuration of the invention, however, it is also possible to realize the braking device so that it can be actuated, and in particular released, electromagnetically.

Finally, as described by an additional advantageous configuration of the invention, the braking device that can be actuated electromagnetically can also be actuated, and in particular released, hydraulically. The hydraulic actuation is then appropriately used in conjunction with a use of the braking device as an operating brake, while the electromagnetically acting actuation device is used to release the parking brake.

In one constructively favorable embodiment of the invention, the braking device has a first braking piston and a second braking piston. The first braking piston is spring-loaded in the direction of the closed position of the braking device, and in the closed position is in contact with the second braking piston. Axially between the two brake pistons, there is also a brake pressure chamber that is connected to a brake pressure channel in the hub carrier. In the open position of the braking device, the second brake piston can be moved by the braking pressure toward the closed position of the braking device.

In an additional advantageous realization of the drive wheel system of the invention, the braking device can be actuated, in particular released, by a hydraulic transmission device. In principle, this device is a "hydraulic linkage".

The transmission device appropriately has a master piston that is located in a master cylinder which is hydraulically connected to a slave cylinder. In the slave cylinder, there is a slave piston that can be released by a spring-loaded brake.

For industrial trucks that are not steered by a tow bar but by a handwheel, for example, the invention teaches that it is advantageous if there is a steering drive with a steering motor or with a steering motor and a downstream or secondary steering gearbox. The steering drive is directly connected with the drive wheel system and has a rotational mounting of the drive wheel system integrated into the steering motor or into the steering gearbox. Compared to known steering drives, which consist of a steering motor with a downstream or secondary gearbox and a chain drive that rotates the drive wheel system, the construction of the invention is significantly more compact.

The steering motor is appropriately realized in the form of a disc armature electric motor and the steering gearbox in the form of a planetary gear train. The base plate of an industrial truck provided with such a drive wheel system can thereby be very low or, conversely, while maintaining the conventional distance between the floor and the base plate, the wheel diameter of the drive wheel system can be increased so that there is more space available for the components of the drive wheel system and/or the industrial truck. Thus, the drive wheel system can carry a heavier load.

To achieve the greatest possible reduction between the speed of the steering motor and the rotational speed of the drive wheel system, the invention teaches that the steering gearbox is a Wolfrom gearbox (a special type of planetary gear train). A drive shaft of the steering motor is non-rotationally connected with a sun wheel of the steering gearbox. There are preferably two ring gears, axially one next to the other, with different numbers of teeth. The first ring gear is non-rotatably mounted and the second, rotating ring gear represents the drive element of the steering drive.

If the rotationally mounted ring gear of the steering gearbox is non-rotationally connected with the hub carrier and is mounted so that it rotates together with the hub carrier in a mounting on which the first ring gear is fastened or molded, the result is a simple integration of the rotational mounting of the drive wheel system in the steering gearbox of the steering drive.

To achieve a direct connection of the steering motor to the drive wheel system, the steering motor is advantageously fastened to the first ring gear. The drive wheel system of the invention is self-contained, compact and steerable, and can be installed and removed as a unit.

BRIEF DESCRIPTION OF THE DRAWINGS

Additional advantages and details of the invention are explained in greater detail below with reference to the exemplary embodiments illustrated in the accompanying schematic drawings, in which.

DESCRIPTION OF THE PREFERRED EMBODIMENTS

For purposes of the description hereinafter, the terms "left", "right", "clockwise", "counterclockwise", and similar directional terms shall refer to the invention as it is shown in the figures. However, it is to be understood that the invention may assume various alternative spacial orientations and, hence, such terms are not to be considered as limiting to the scope of the invention.

Figure 1:
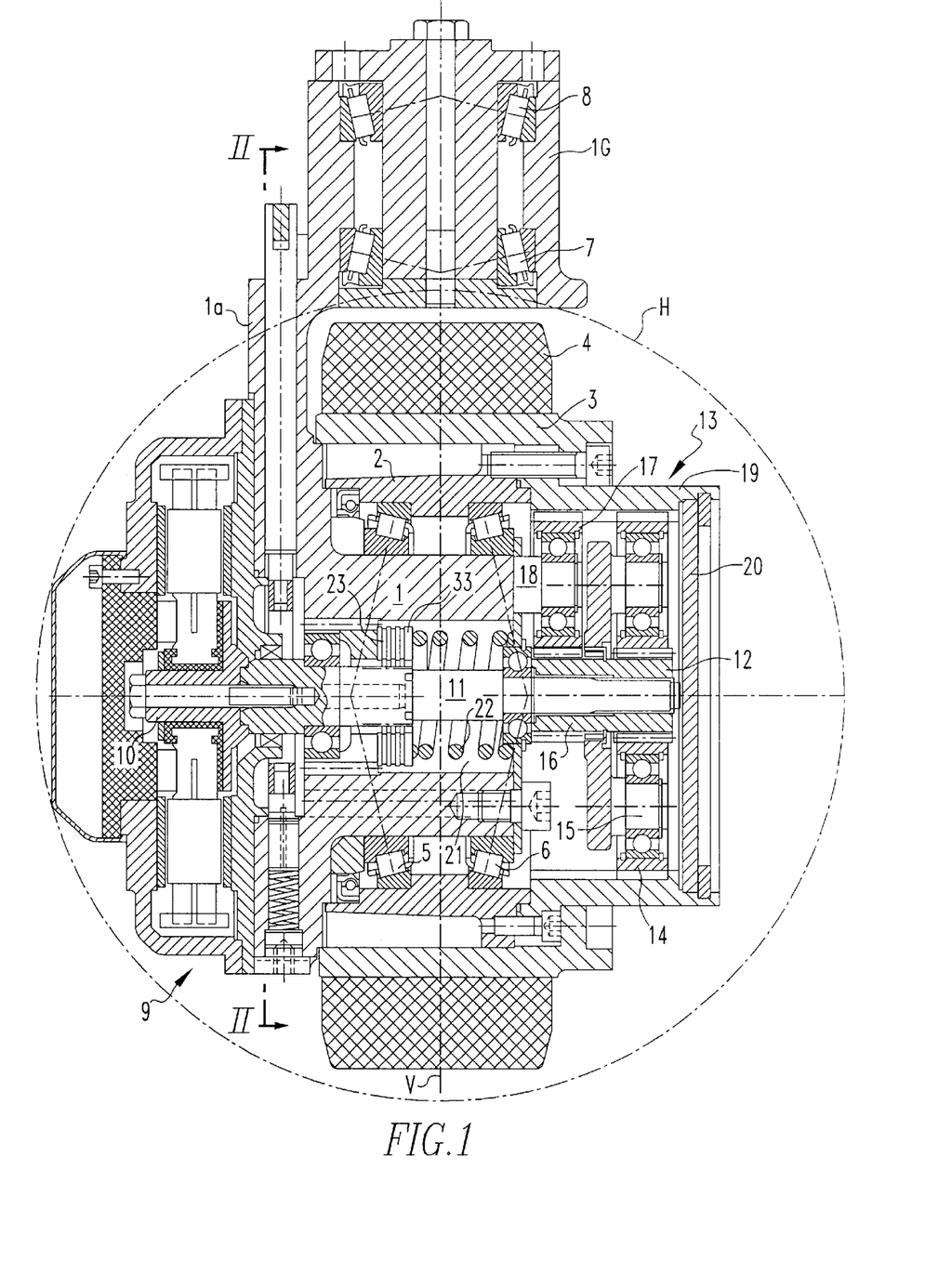
FIG. 1 is a cross section through a drive wheel system of the invention.

As shown in FIG. 1, the drive wheel system of the invention can be rotated around a vertical axis V, and has as its basic elements a hub carrier 1 and a hub 2 that is rotatably mounted on the hub carrier 1. The mounting of the hub 2, to which is fastened a rim 3 of a wheel 4, is accomplished by means of two tapered roller bearings 5 and 6, preferably conical roller bearings, and are oriented substantially symmetrically with respect to the vertical axis V. The hub carrier 1 is provided with an arm 1a that is bent at a substantially right angle. On the upper end of the arm 1a there is a molded-on bearing bush 1b. In the bearing bush 1b there are tapered roller bearings 7 and 8 realized in the form of conical roller bearings, by means of which the hub carrier 1 and thus the drive wheel system can be rotated around the vertical axis V.

On the side of the drive wheel system next to the arm 1a that is bent at a right angle of the hub carrier 1 (the left side in FIG. 1), the invention teaches that a travel motor 9 realized in the form of a disc armature motor is fastened. The drive shaft 10 of the travel motor 9 is connected to an intermediate shaft 11 that penetrates the hub carrier 1 centrally and is mounted in the hub carrier 1. On the right end of the intermediate shaft 11 in FIG. 1 that is opposite to the end on which the travel motor 9 is located, a spline connection molded onto the intermediate shaft 11 is engaged in a hollow gearing of a sun gear or wheel 12 of a first stage of a travel gearbox 13 that is realized in the form of a two-stage planetary gear train. A web 15 provided with planetary gears or wheels 14 of the first stage of the travel gearbox 13 is connected in conventional manner with a sun gear or wheel 16 of the second stage of the travel gearbox 13. The sun wheel 16 is engaged with planetary gears or wheels 17 that are mounted on a web 18 of the second stage of the travel gearbox 13. The web 18 is preferably molded onto the end surface of the hub carrier 1.

The planetary wheels 14 and 17 of both the first and the second stages of the travel gearbox 13 roll inside a common ring gear 19, which forms the output element of the travel gearbox 13 and together with a disc 20 that is inserted on the end surface into the ring gear 19 serves as the transmission housing. The ring gear 19 is bolted to the hub 2 so that it transmits its rotational movement to the drive wheel 4.

In a central recess 21 of the hub carrier 1 there is a braking device that is realized in the form of a wet-running spring-loaded multi-disc brake having a compression spring 22 and brake discs 23. The braking device, in its initial position, blocks the travel motor 9 because the intermediate shaft 11 is coupled to the hub carrier 1.

The drive wheel system of the invention has compact dimensions. The diameter of an imaginary envelope circle H—viewed in section along the axis of rotation of the wheel 4—that results when the drive wheel system rotates around the vertical axis V, approximately equals the outside diameter of the drive wheel 4.

Figure 2:
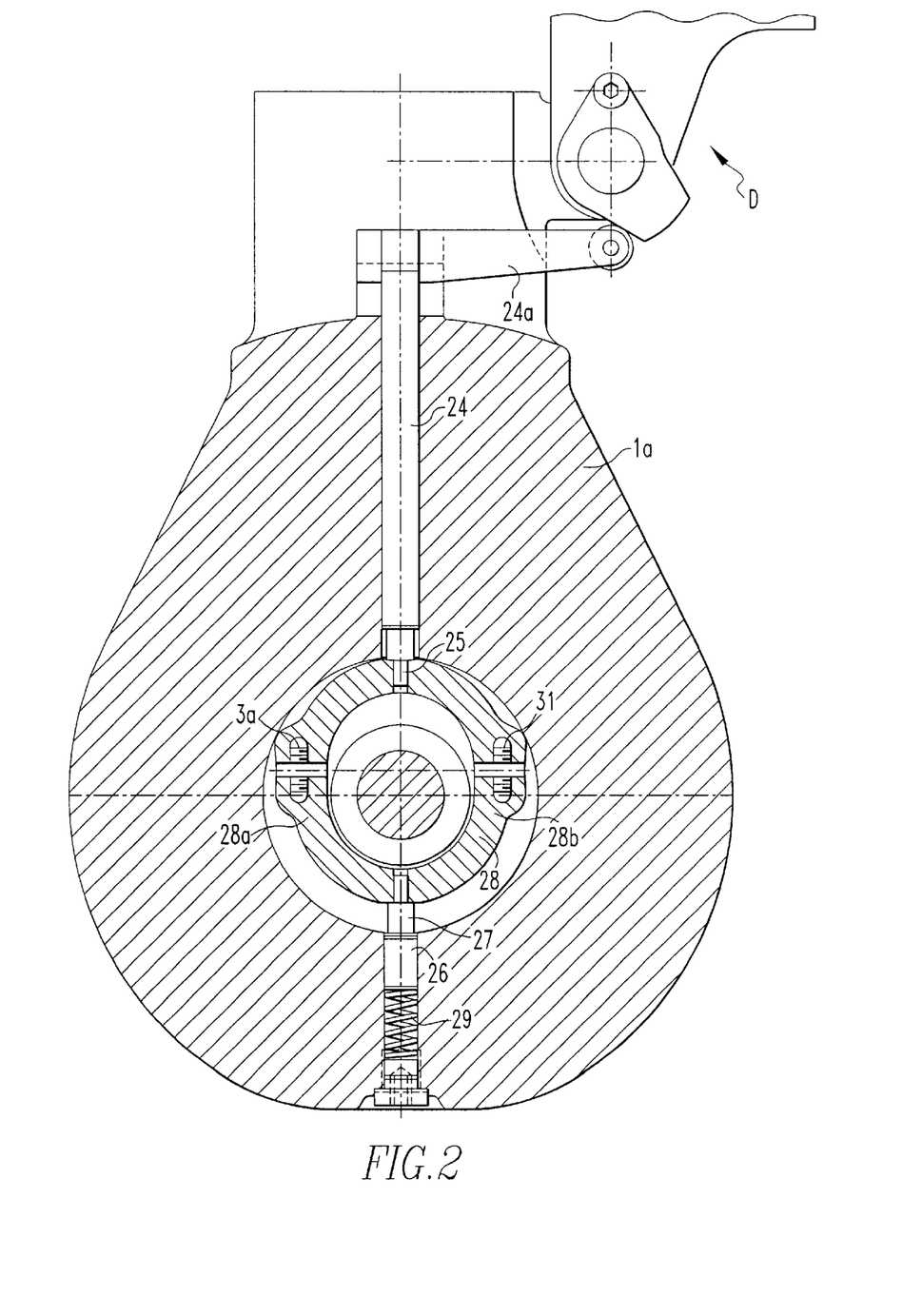
FIG. 2 is a section taken along the line II—II in FIG. 1.
Figure 3:
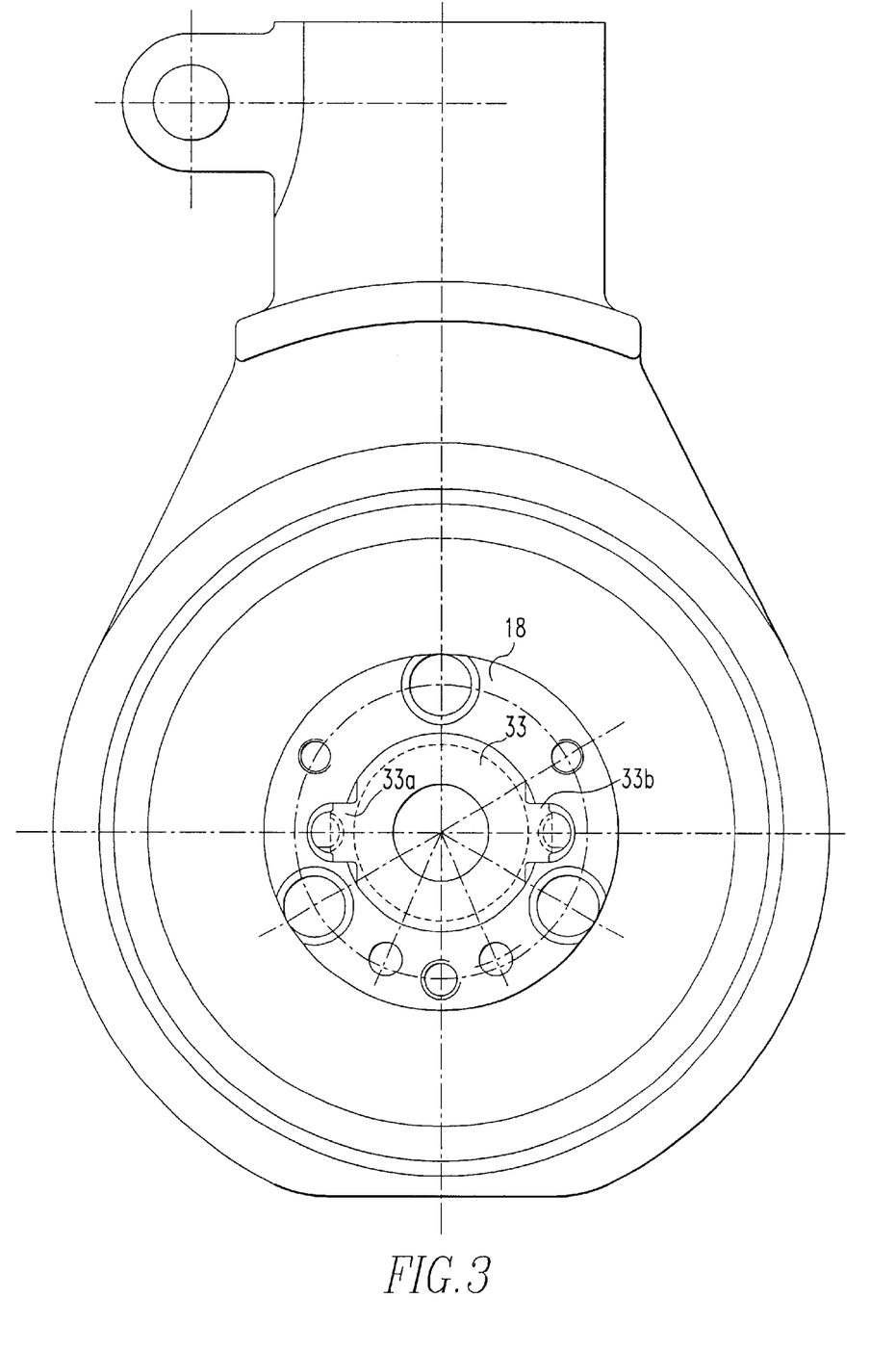
FIG. 3 is a side view of a hub carrier of the drive wheel system illustrated in FIG. 1.
Figure 4:
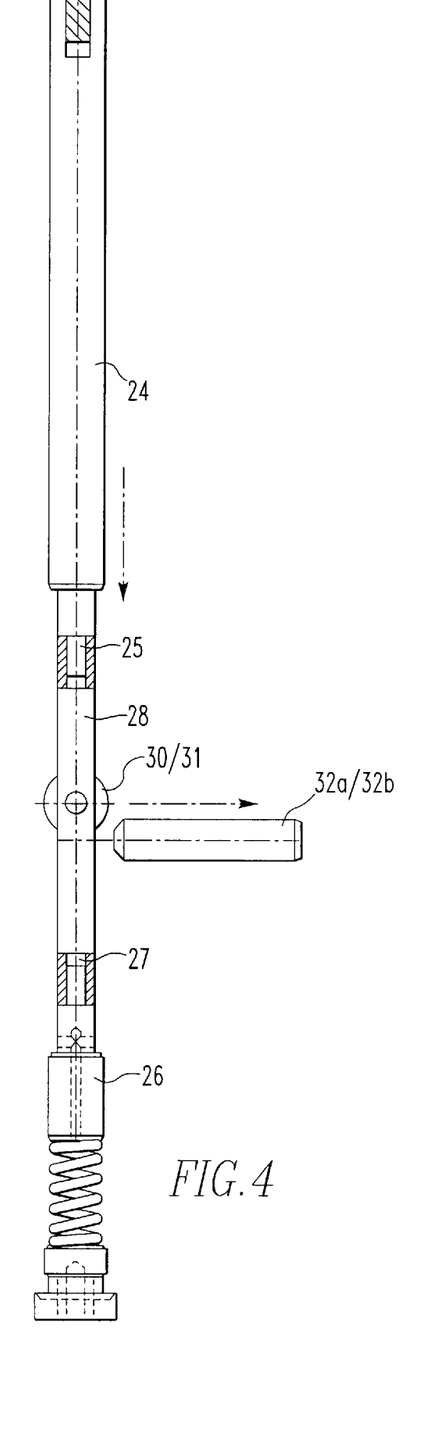
FIG. 4 is a plan view of a linkage that may be effectively connected with a braking device of the invention.

The components necessary for the actuation of the braking device illustrated in FIG. 1 are explained in greater detail in FIGS. 2, 3 and 4.

A vertically oriented rod 24 in the arm 1a bent at a right angle with respect to the hub carrier 1 can be moved downwardly by means of a horizontal lever 24a through, for example, the tow bar D of a tow bar-guided lift truck. The rod 24, on its vertically lower end, has a pin 25 which together with a pin 27 molded onto the upper end of a rod or tappet 26 guides a ring-shaped disc 28 so that it can be moved vertically up and down. The tappet 26 is pushed upwardly by the force of a spring 29.

In each of two lateral cheeks 28a and 28b of the ring-shaped disc 28, there are respective ball bearings 30 and 31 that act as cams. During a downward movement, these ball bearings are each engaged by their outer ring with respective horizontal pins 32a and 32b and press them (FIGS. 1 and 4) to the right (indicated by arrows in FIG. 4). The horizontal pins 32a and 32b each are stopped against respective radial lugs 33a and 33b of a release plate 33, which is located axially between the compression spring 22 and the brake discs 23, and press this release plate 33 to the right until ultimately the brake discs 23 are released and the braking device is released.

Figure 5:
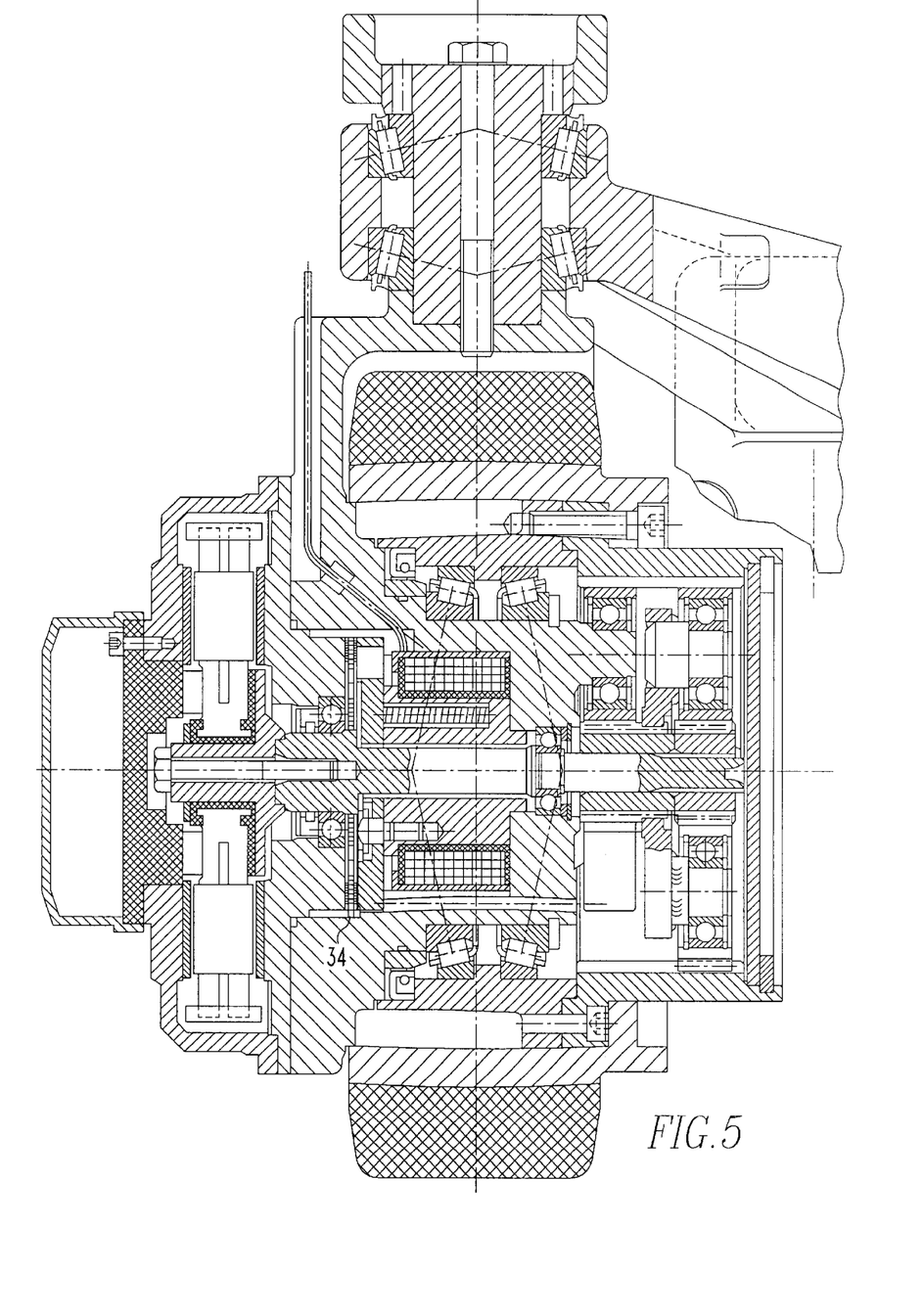
FIG. 5 is a cross section through a first variant of a drive wheel system of the invention.

FIG. 5 illustrates a variant of the drive wheel system in which the braking device is actuated not mechanically by a linkage, but electromagnetically. Instead of brake discs, there is a brake disc 34 that is provided with friction linings on both sides and is spring-loaded. The brake disc 34 can be released electromagnetically in conventional manner.

Figure 6:
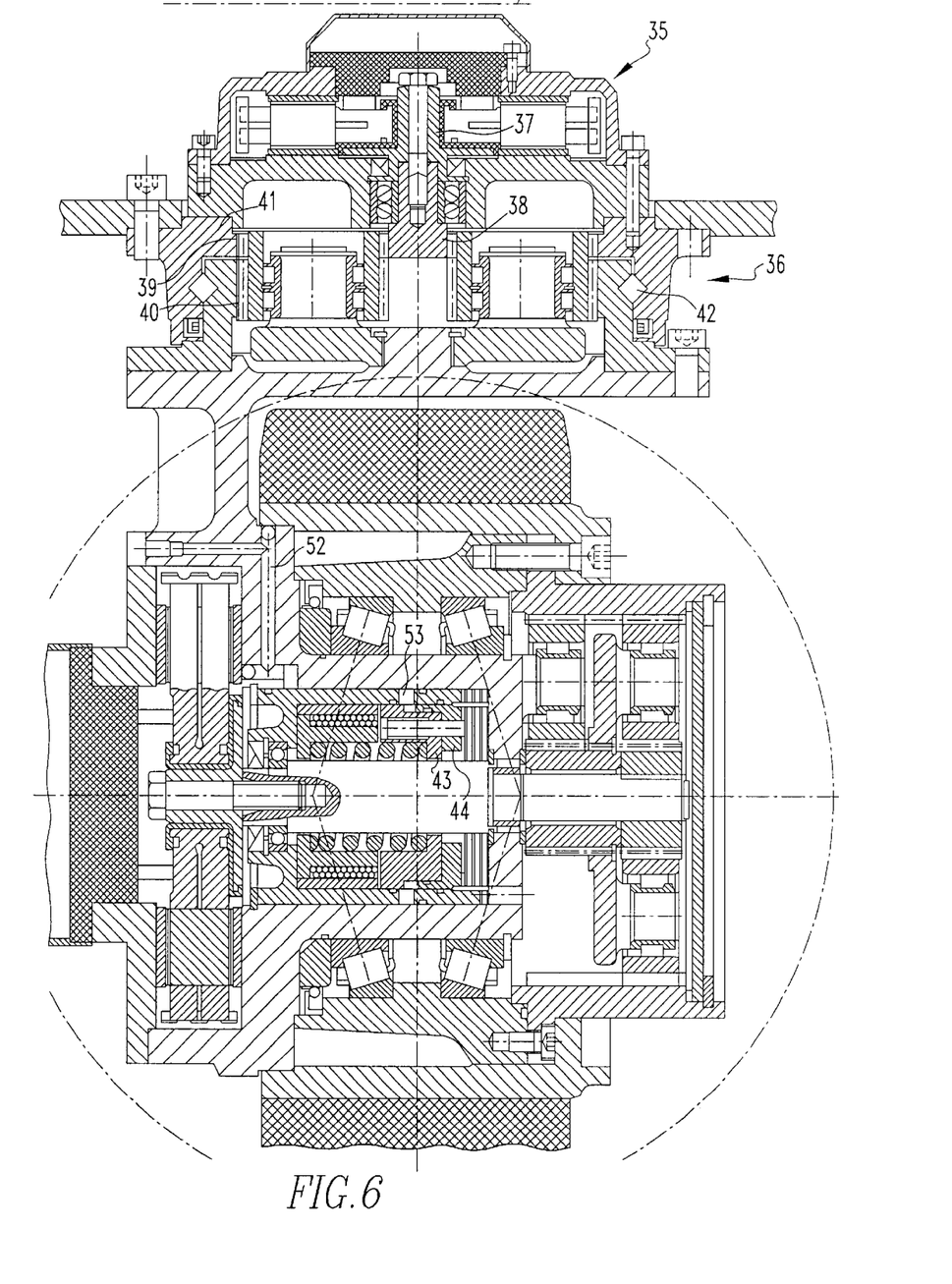
FIG. 6 is a cross section through a second variant of a drive wheel system of the invention.

FIG. 6 shows the cross section through an additional variant of the drive wheel system of the invention which can also be used by means of an integrated steering drive in industrial trucks that do not have a tow bar for steering, but are steered by a handwheel, for example.

The steering drive is provided with a steering motor 35 that is realized in the form of a disc armature electric motor and a steering gearbox 36 connected downstream of the motor. In this embodiment, the steering gearbox is a planetary gear train (Wolfrom gearbox). A hydraulic steering motor can also be used in place of an electric steering motor with a downstream steering gearbox.

A drive shaft 37 of the steering motor 35 is non-rotationally connected to a sun gear or wheel 38 of the steering gearbox 36. The steering gearbox 36 has two ring gears 39 and 40 one axially next to the other, with slightly different numbers of teeth. The upper (first) ring gear 39 in FIG. 6 is fastened or molded to a mounting 41, in which the lower (second) ring gear 40 is rotationally mounted. The mounting 41 is provided with means for fastening to an industrial truck.

In this example, for the rotational mounting of the second ring gear 40 in the mounting 41, a cross-head roller bearing is used, which simultaneously represents the rotational mounting 42 of the drive wheel system necessary for the steerability of the drive wheel system. The second ring gear 40 forms the output element of the steering drive and is non-rotationally connected with the hub carrier 1. In this embodiment, the rotational mounting 42 of the drive wheel system is therefore integrated into the steering gearbox 36 of the steering drive.

Because the steering motor 35 is fastened directly to the ring gear 39, the result is a self-contained, compact and steerable drive wheel system which can be installed and removed as a unit, i.e., together with the steering drive. This arrangement achieves the minimum possible distance between the road and the base plate (indicated by the horizontal broken line B) of an industrial truck equipped with the drive wheel system of the invention.

Figure 7:
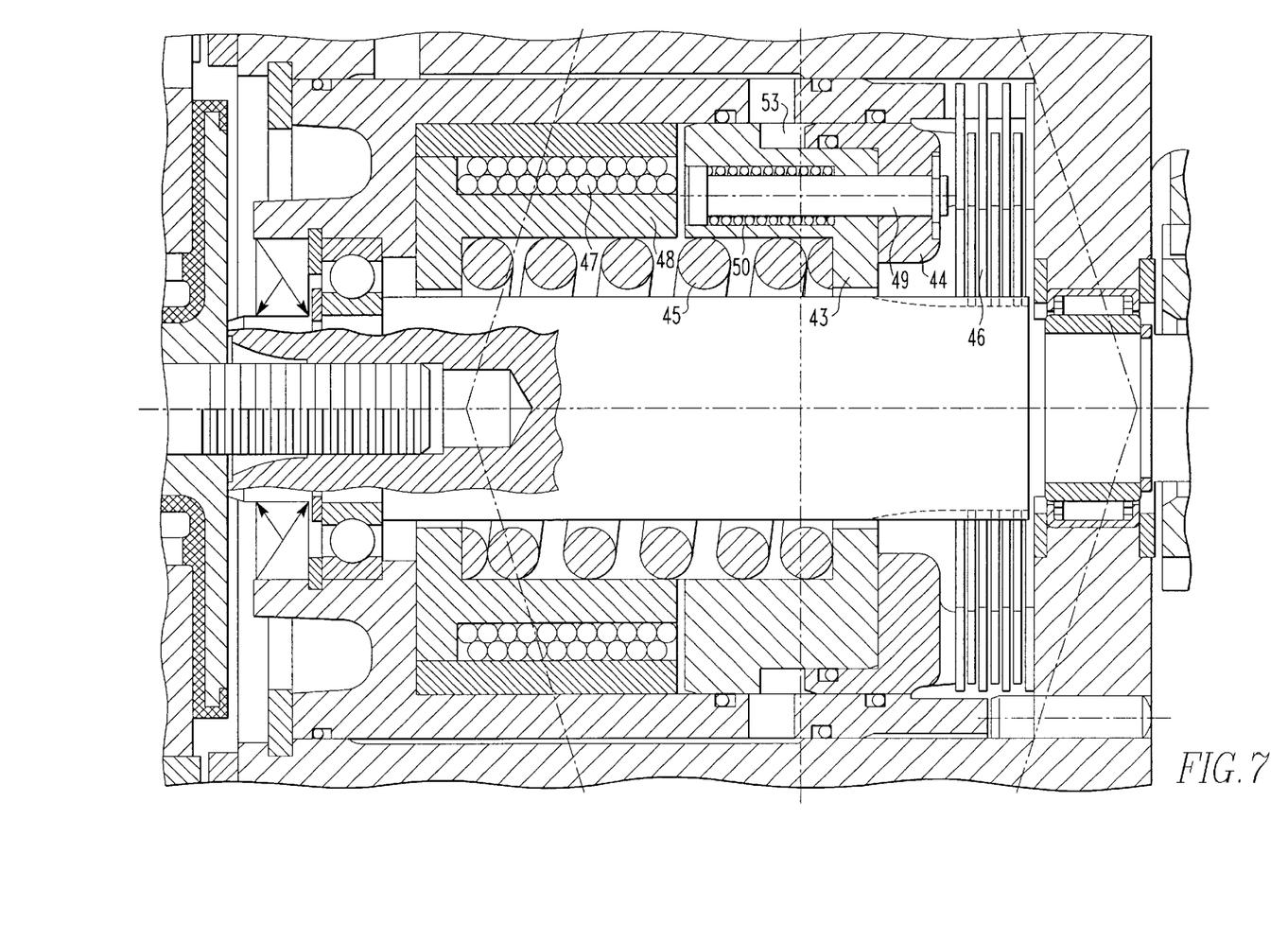
FIG. 7 is an enlarged detail from FIG. 6.

FIGS. 6 and 7, considered together, illustrate an additional variant of the braking device. In this case the braking device has a first brake piston 43 and a second brake piston 44. The first brake piston 43 is pressed by the force of a spring 45 toward the closed position of the braking device, and in the closed position is in contact with the second brake piston 44. The spring 45, via the two brake pistons 43 and 44, thereby exerts a braking force on the brake disc package 46. In this operating position, the brake is closed and is used as a parking brake.

The braking device can be released electromagnetically. A current-carrying winding 47 therefore exerts a magnetic force opposed to the force of the spring 45, and moves the first brake piston 43 to the left in FIGS. 6 and 7, until the brake piston comes to a stop against the winding carrier 48. The second brake piston 44 is thereby carried along by a plurality of pins 49 distributed over the periphery. Each pin 49 has a compression spring 50 which, in cooperation with a pin-type retaining ring 51, presses the second brake piston 44 against the first brake piston 43.

Axially between the two brake pistons 43 and 44 there is a brake pressure chamber 53 that is connected to a brake pressure channel 52 in the hub carrier 1. If this brake pressure chamber 53 is pressurized with the brake pressure in the open position of the braking device, the second brake piston 44 is moved against the force of the compression springs 50 acting on the pins 49 toward the closed position of the braking device. In this manner, braking is possible in spite of the fact that the parking brake is released. The braking device can therefore also be used as an operating brake.

Figure 8:
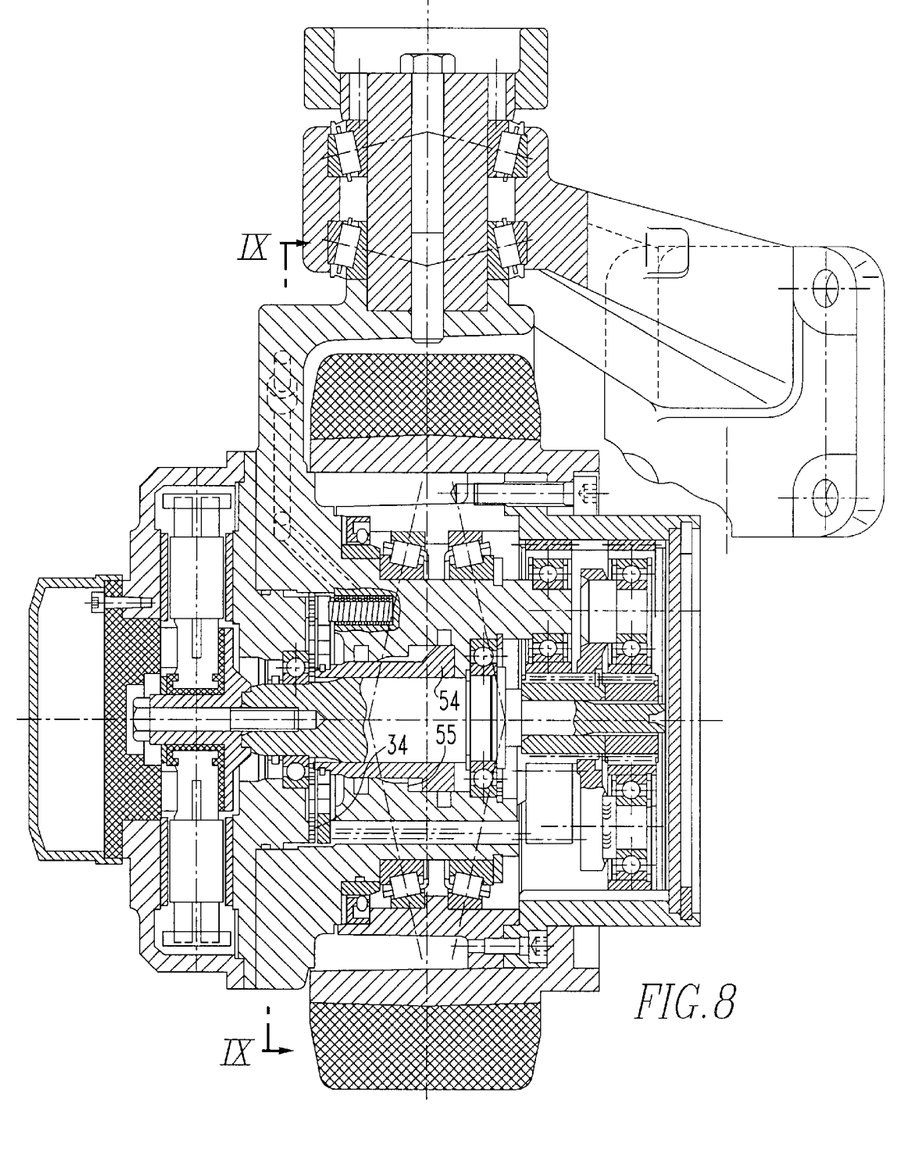
FIG. 8 is a cross section through a third variant of a drive wheel system of the invention.
Figure 9:
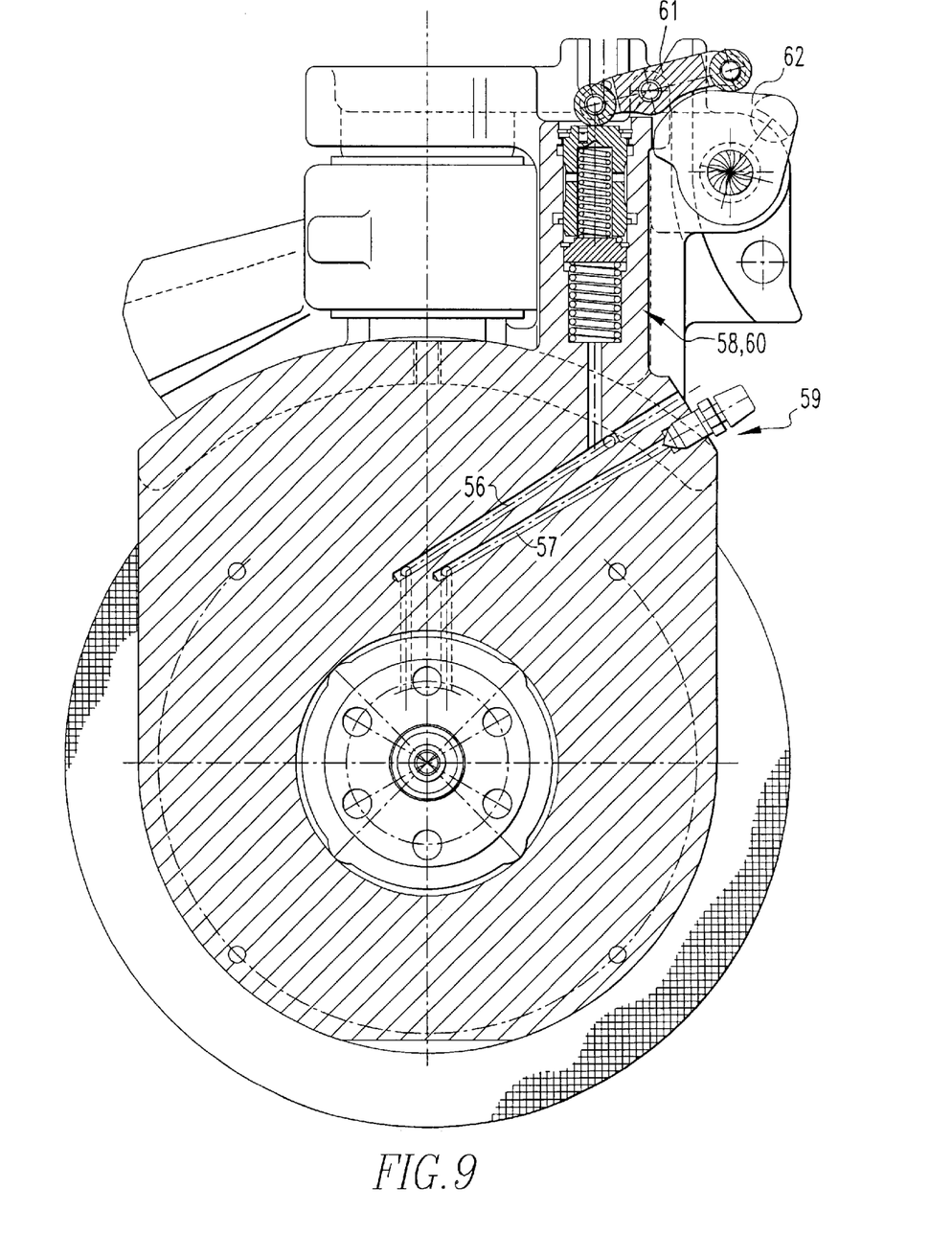
FIG. 9 is a section along the line IX—IX in FIG. 8.
Figure 10:
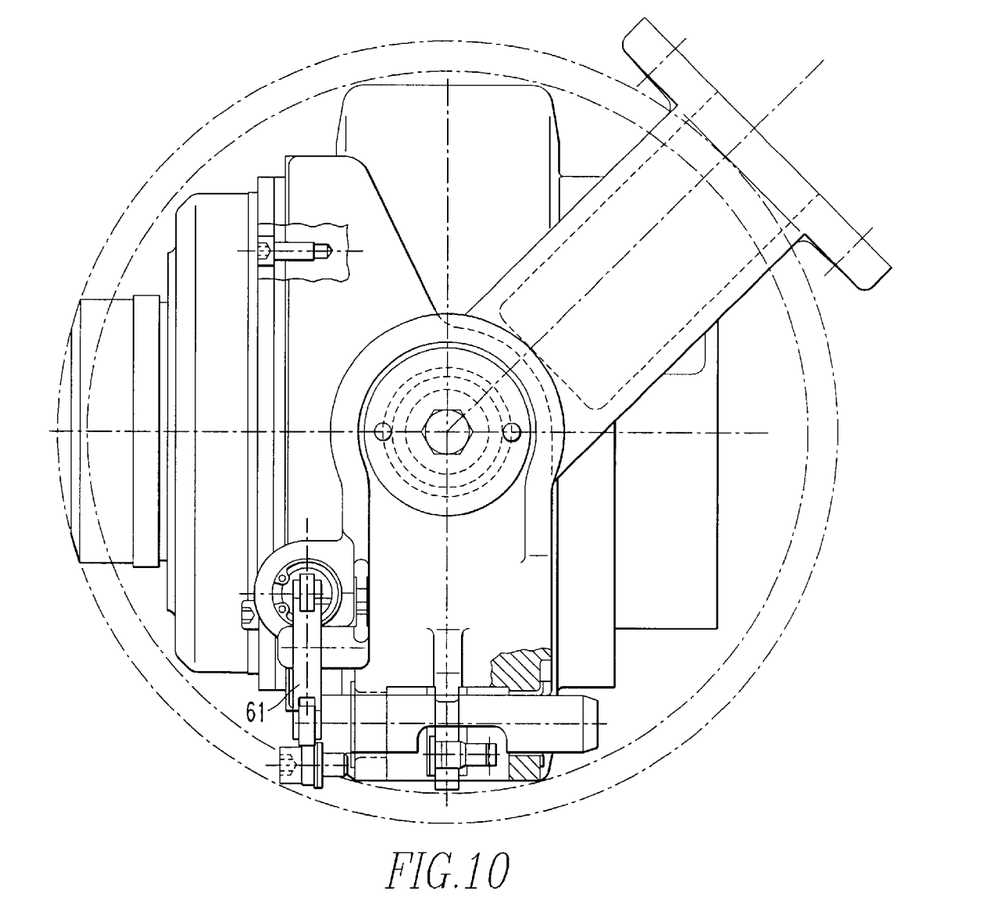
FIG. 10 is a plan view of a fourth variant of a drive wheel system.

FIGS. 8 to 11 illustrate a variant of the drive wheel system of the invention, in which the braking device can be actuated by a hydraulic transmission device. As in the embodiment illustrated in FIG. 5, here, too, there is a spring-loaded brake disc 34 that is provided with friction linings on both side surfaces and can be hydraulically released by means of a slave piston 54. The slave piston 54 is located in a slave cylinder 55 to which—as illustrated in FIG. 9—two channels 56 and 57 are connected.

The channel 56 leads to a master cylinder 58 and the channel 57 to a closable vent opening 59. In the master cylinder 58 there is a master piston 60, which can be actuated by the rocker arm 61 that is effectively connected to a tow bar (not shown).

The rocker arm 61 is pivoted by means of a cam disc 62, which is coupled with the tow bar. Depending on the position of the tow bar and thus of the cam disc 62, the rocker arm 61 acts on the master piston 60 or it does not.

Figure 11:
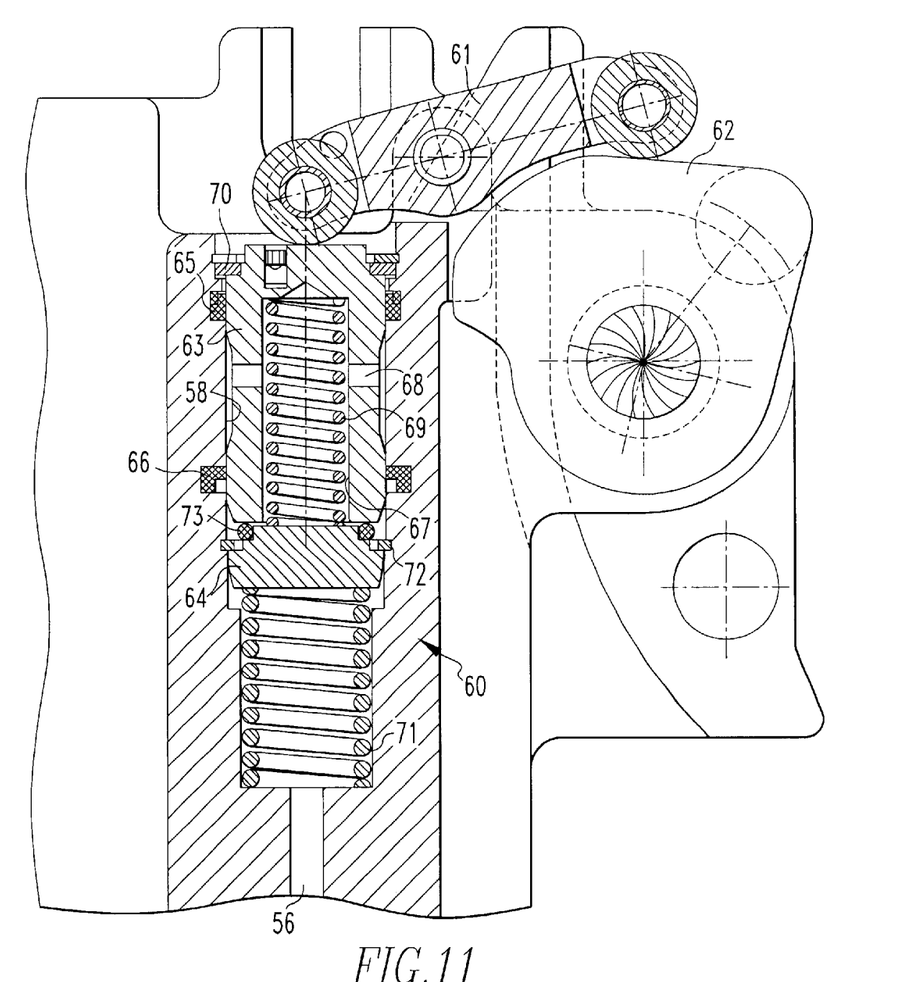
FIG. 11 is an enlarged detail from FIG. 9.

The construction of the master piston 60 is illustrated in FIG. 11, which shows the master piston 60 in the unactuated position. In this case the fluid column between the master cylinder 58 and the slave cylinder 55 is released, i.e., the brake is closed by the action of the spring-loading mechanism. This situation corresponds to operation during which the vehicle is stopped and the tow bar is released, and is therefore oriented approximately vertically.

The master piston 60 consists of an outer piston 63 and an inner piston 64. The outer piston 63 is sealed by means of two gaskets 65, 66 in the master cylinder and has a central blind hole 67 that is open toward the inside, with transverse borings 68 that are in communication with the blind boring 67. The transverse borings emerge axially between the gaskets 65, 66. In the blind boring 67, which serves as a reservoir chamber, there is a compression spring 69 which, when the master piston 60 is depressurized, presses the outer piston 63 against a stop 70. The compression spring 69 is supported on the inside piston 64, which for its part is pressed by a compression spring 71 against a stop 72. In the illustrated position, an axial gap is formed between the outer piston 63 and the inner piston 64. Through this gap, hydraulic fluid can flow out of the blind boring 67 to the channel 56, e.g., during leakages, or vice versa, when the brake linings are worn, the additional hydraulic fluid displaced from the channel 56 by the amount of the wear can flow into the blind boring 67. The level of hydraulic fluid in the blind boring 67 is located at the level of the transverse borings 68.

If, as a result of the actuation of the tow bar, the rocker arm 61 is rotated counterclockwise, first the outer piston 63 is moved downwardly in opposition to the force of the compression spring 69 until it comes into contact with the inner piston 64. Then, the inner piston 64 is also moved downwardly in opposition to the force of the compression spring 71. A hydraulic pressure is thereby built up in the channel 56 and thus in the slave cylinder 55, which pressurizes the slave piston 54 and releases the brake. A gasket 73 prevents hydraulic fluid that gets past the inner piston 64 from flowing into the blind boring 67 of the outer piston 63.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

I claim:

1. A drive wheel system for industrial trucks that can be rotated around a vertical axis, comprising:
   a hub carrier;
   a hub mounted on the hub carrier;
   a driven wheel carried on the hub; and
   an electric travel motor configured to rotate the wheel, wherein the travel motor is a disc armature motor,
   wherein the travel motor is connected to a travel gearbox, and
   wherein the wheel and the hub are located axially between the travel motor and the travel gearbox.

2. The drive wheel system as claimed in claim 1, wherein the travel motor and the hub with the wheel, viewed in section along an axis of rotation of the wheel, are located substantially inside an imaginary circular envelope having a diameter approximately equal to an outside diameter of the wheel.

3. The drive wheel system as claimed in claim 1, wherein the travel gearbox includes a planetary gear train.

4. The drive wheel system as claimed in claim 3, wherein a drive shaft of the travel motor is non-rotationally connected with a sun wheel of a first stage of the travel gearbox, a web of a second stage of the travel gearbox is non-rotationally connected with the hub carrier, and a ring gear of the second stage of the travel gearbox is connected with the hub.

5. The drive wheel system as claimed in claim 1, wherein the hub is mounted by two tapered roller bearings that are located approximately symmetrically to the vertical axis.

6. The drive wheel system as claimed in claim 1, including a braking device located radially inside a mounting of the hub and axially between the travel motor and the travel gearbox.

7. The drive wheel system as claimed in claim 6, wherein the braking device includes a wet-running spring-loaded multi-disc brake.

8. The drive wheel system as claimed in claim 6, wherein the braking device is actuated electromagnetically.

9. The drive wheel system as claimed in claim 8, wherein the electromagnetically actuated braking device is also actuated hydraulically.

10. The drive wheel system as claimed in claim 1, wherein the travel motor, the hub with the wheel and the travel gearbox, viewed in section along an axis of rotation of the wheel, are located substantially inside an imaginary circular envelope having a diameter substantially equal to an outside diameter of the wheel.

11. A drive wheel system for industrial trucks that can be rotated around a vertical axis comprising:
   a hub carrier;
   a hub mounted on the hub carrier;
   a driven wheel carried on the hub; and
   an electric travel motor configured to rotate the wheel, wherein the travel motor is a disc armature motor,
   wherein the travel motor is connected to a travel gearbox, including a braking device located radially inside a mounting of the hub and axially between the travel motor and the travel gearbox,
   wherein the braking device is actuated electromagnetically,
   wherein the electromagnetically actuated braking device is also actuated hydraulically,
   wherein the braking device has a first brake piston and a second brake piston, wherein the first brake piston is spring-loaded toward a closed position of the braking device, and in the closed position is in contact with the second braking piston, wherein axially between the two brake pistons there is a brake pressure chamber that is connected to a brake pressure channel in the hub carrier, and wherein in an open position of the braking device, the second brake piston is movable by brake pressure toward the closed position of the braking device.

12. A drive wheel system for industrial trucks that can be rotated around a vertical axis, comprising:
   a hub carrier;
   a hub mounted on the hub carrier;
   a driven wheel carried on the hub; and
   an electric travel motor configured to rotate the wheel, wherein the travel motor is a disc armature motor,
   wherein the travel motor is connected to a travel gearbox, and wherein the system includes at least one of a steering drive with a steering motor and a steering motor and a downstream steering gearbox, wherein the steering drive is connected directly with the drive wheel system and has a rotational mounting of the drive wheel system integrated into the steering motor or into the steering gearbox.

13. The drive wheel system as claimed in claim 12, wherein the steering motor is a disc armature electric motor and the steering gearbox includes a planetary gear train.

14. The drive wheel system as claimed in claim 13, wherein the steering gearbox is a Wolfrom gear train, wherein a drive shaft of the steering motor is non-rotationally connected with a sun wheel of the steering gearbox and wherein the steering gearbox has first and second ring gears with different numbers of teeth located axially one next to the other, with the first ring gear non-rotationally fastened to a mounting and with the second ring gear rotatably mounted as the driven element of the steering drive.

15. The drive wheel system as claimed in claim 14, wherein the rotatably mounted ring gear of the steering gearbox is non-rotationally connected with the hub carrier and together with the hub carrier is rotatably mounted on the mounting to which the first ring gear is attached.

16. The drive wheel system as claimed in claim 15, wherein the steering motor is fastened to the first ring gear.

* * * * *

UNITED STATES PATENT AND TRADEMARK OFFICE
CERTIFICATE OF CORRECTION

PATENT NO. : 6,367,571 B1  Page 1 of 1
DATED : April 9, 2002
INVENTOR(S) : Ulrich Scwarz It is certified that error appears in the above-identified patent and that said Letters Patent is hereby corrected as shown below:

<u>Column 3,</u>
Lines 44-45, "a fourth variant of a drive wheel system" should read -- the third variant of the drive wheel system shown in FIG. 8 --.

Signed and Sealed this

Twenty-sixth Day of November, 2002

*Attest:*

*Attesting Officer*

JAMES E. ROGAN
*Director of the United States Patent and Trademark Office*